United States Patent [19]
Berg

[11] 3,749,118
[45] July 31, 1973

[54] HOME FIRE STANDBY HOSE ASSEMBLY

[75] Inventor: Norman H. Berg, Bellmore, N.Y.

[73] Assignee: The Raymond Lee Organization Inc., New York, N.Y. ; a part interest

[22] Filed: Sept. 16, 1971

[21] Appl. No.: 181,065

[52] U.S. Cl. ............................................ 137/355.28
[51] Int. Cl. .............................................. B65h 75/36
[58] Field of Search .................... 137/355.18, 355.28

[56] References Cited
UNITED STATES PATENTS

| | | | |
|---|---|---|---|
| 1,870,322 | 8/1932 | Brown | 137/355.18 |
| 2,634,071 | 4/1953 | Lund | 137/355.28 X |
| 1,658,793 | 2/1928 | Hansen | 137/355.18 |
| 2,719,752 | 10/1955 | Dodge, Jr. et al. | 137/355.18 |
| 2,756,101 | 7/1956 | Cauffman | 137/355.18 |
| 2,780,430 | 2/1957 | Pokryfke | 137/355.28 X |
| 3,575,202 | 4/1971 | Turek | 137/355.18 |
| 3,670,763 | 6/1972 | Magdars | 137/355.18 |

*Primary Examiner*—Samuel Scott
*Attorney*—Howard I. Podell

[57] ABSTRACT

A compact fire-fighting unit for home use comprising a rack assembly to support folded fire hose and nozzle which is connected to a water pipe and valve, with a magnetically latching door. The unit may be fastened to wall studs for flush mounting. The rack unit is of two-piece construction so that the hose may be readily slipped off rack when required.

2 Claims, 3 Drawing Figures

PATENTED JUL 31 1973 3,749,118

INVENTOR.
NORMAN H. BERG

HOME FIRE STANDBY HOSE ASSEMBLY

SUMMARY OF THE INVENTION

The purpose of my invention is to provide standby emergency means for fighting fires in residences in order to contain such fires to ensure complete and safe evacuation of the residence.

My invention consists of a unit adaptable to being built into the walls of a residence room, with fire hose and nozzle retained on a two-piece rack, the rack unit disassembling and releasing the fire hose as required, together with a valve for permanent attachment to a water supply pipe. The entire unit is concealed, when not required, by magnetically latching doors.

BRIEF DESCRIPTION OF THE DRAWINGS

The objects and features of the invention may be understood with reference to the following detailed description of an illustrative embodiment of the invention taken together with the accompanying drawing in which.

DESCRIPTION OF THE PREFERRED EMBODIMENT

Figures 1, 2, 3:
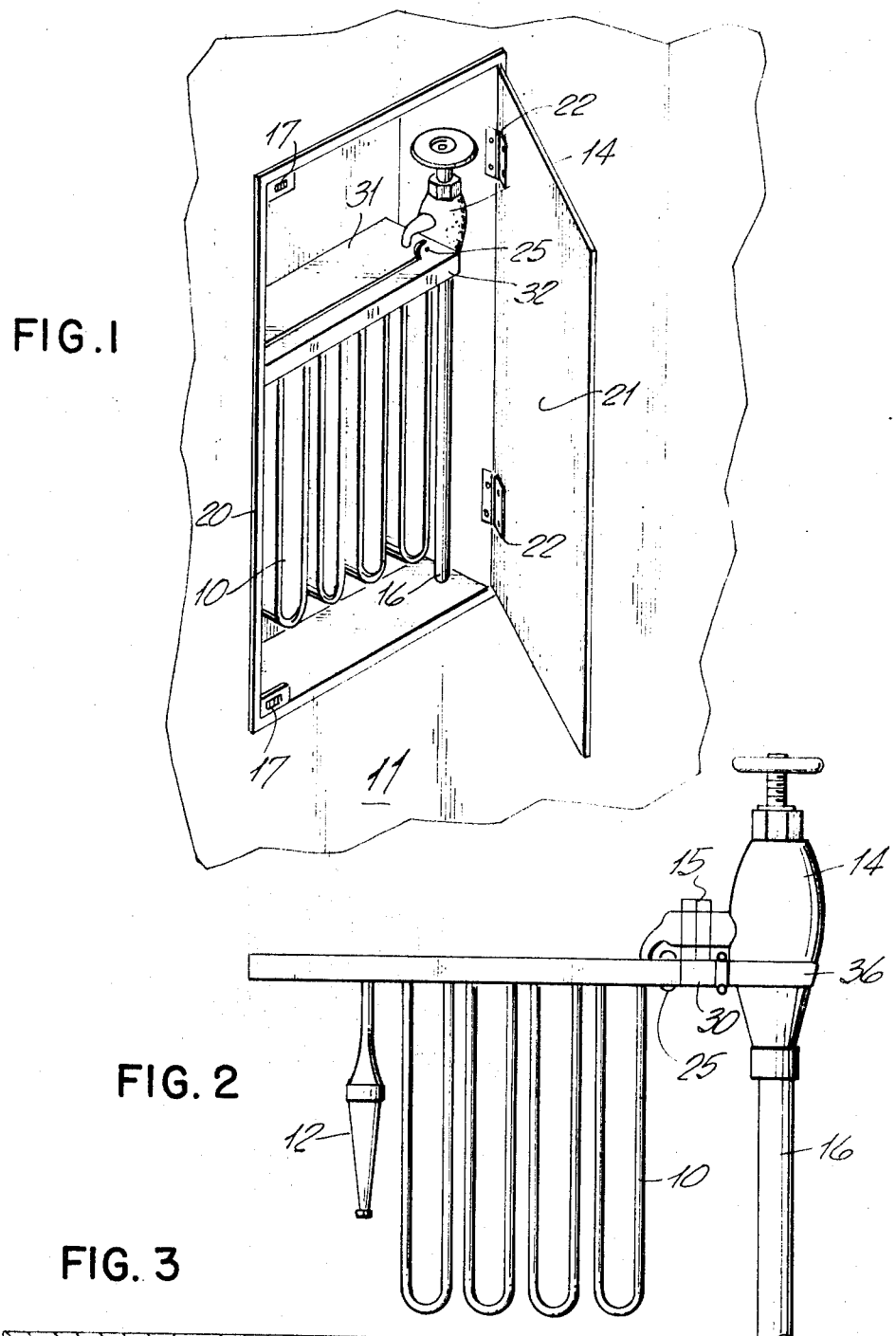
FIG. 1 is a perspective view of the unit installed.
FIG. 2 is an elevation of the hose rack with hose mounted onto a valved water supply pipe.
FIG. 3 is a cross-section of the hose rack and hose, illustrating the mechanism for hanging of the hose.

Turning now descriptively to the drawings, in which similar reference characters denote similar elements throughout the several views, FIG. 1 illustrates the unit 20 installed relatively flush to the wall 11 of a residence room, and completely enclosed by door 21 pivoting about hinges 22. The door is latched by magnetic blocks 17 so that in the closed position, the door exterior presents a smooth surface contiguous with the wall, and yet the door may be immediately opened in the event of an ermergency without the possibility of being snagged by a defective latch assembly.

As shown in FIG. 1 and FIG. 2, a valve 14 is mounted on the top of a water supply line 16, with the hose being connected at flange 15 to the valve. Nozzle 12 is preferably of the non-adjustable type. The hose rack 30 is mounted by strap 36 about the valve body 14. The hose 10 is hung on supports 34 which fit loosely into undercut groove 35 of fixed member 31 of the hose rack 30. These hose supports 34 also rest loosely on ledge 37 of the pivotable member 32 of the hose rack. The pivotable section of the hose rack is pinned at 25 to the fixed member 31.

In the event of an emergency, a pull on the fire hose 10 from outside the unit will rotate the pivotable section 32 of the hose rack into the room and permit the hose to slide freely off the hose supports 34.

Since obvious changes may be made in the specific embodiment of the invention described herein without departing from the scope thereof, it is indicated that all matter contained herein is intended to be interpreted in an illustrative and not in a limiting sense.

I claim:

1. A standby fire hose assembly, adaptable for mounting to an outlet of an emergency water supply piping system, comprising a two-piece hose rack which supports a flexible fire hose in the folded condition of the fire hose, said hose rack being formed of two members pivotably joined to each other, with the first of said members fitted with fastening means for fixed attachment to the outlet of the water supply piping system, with the first of said hose rack members formed with an undercut groove in the interior side of the said fixed first member running the length of the said member, said undercut groove retaining in a sliding fit, hose support members, the free ends of which hose support members are also supported in the stored position loosely on an interior ledge of an interior side of the other pivotable hose rack member, such that rotation of the pivotable hose rack member detaches the free ends of the hose support members so as to permit a fire hose folded on the hose support members to freely slide off the unsupported free end of the hose support members.

2. The combination recited in claim 1, together with a stored fire hose assembly mounted on the support members and fitted into a storage cabinet with a hinged external door, such that the pivotable hose rack member is located adjacent to the door of the storage cabinet.

* * * * *